United States Patent [19]

Braun et al.

[11] Patent Number: 4,810,305
[45] Date of Patent: Mar. 7, 1989

[54] HYDROPHOBIC PIGMENTS AND FILLERS FOR INCORPORATION IN SYNTHETIC RESINS

[75] Inventors: Rolf M. Braun; Peter Panek; Horst Bornefeld; Dieter Räde; Wolfgang Ritter, all of Krefeld, Fed. Rep. of Germany

[73] Assignee: Bayer Aktiengesellschaft, Leverkusen, Fed. Rep. of Germany

[21] Appl. No.: 81,427

[22] Filed: Aug. 4, 1987

[30] Foreign Application Priority Data

Aug. 21, 1986 [DE] Fed. Rep. of Germany ....... 3628320

[51] Int. Cl.$^4$ ................................. C08K 5/54
[52] U.S. Cl. .................................... 106/499; 106/490; 106/446; 106/426; 106/414; 106/410; 106/417; 106/456; 106/404; 106/421; 106/452; 106/454; 106/465; 106/416; 528/31; 556/451
[58] Field of Search ...................... 528/31; 556/451; 106/288 R, 288 B, 288 Q, 499, 490, 446, 426, 414, 410, 417, 456, 404, 421, 452, 454, 465, 416

[56] References Cited

U.S. PATENT DOCUMENTS

| | | | |
|---|---|---|---|
| 2,938,009 | 5/1960 | Lucas | 524/588 |
| 3,132,961 | 5/1964 | Pierpoint et al. | 106/309 |
| 3,649,321 | 3/1972 | Durrant et al. | 106/308 Q |
| 3,849,152 | 11/1974 | Mimeault | 106/309 |
| 4,698,386 | 10/1987 | Fujimoto | 528/31 |

FOREIGN PATENT DOCUMENTS 809284 2/1959 United Kingdom .

OTHER PUBLICATIONS

Week B24 *J5 4056-083.

*Primary Examiner*—Paul Lieberman
*Assistant Examiner*—Helene Kirschner
*Attorney, Agent, or Firm*—Sprung Horn Kramer & Woods

[57] ABSTRACT

A modified hydrophobic colored or magnetic pigment or filler comprising a hydrophobic pigment or filler containing from 0.05 to 10% by weight, based on the weight of the pigment or filler, of an organopolysiloxane corresponding to the formula

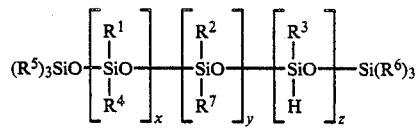

wherein
$x = 0$ to 500,
$y = 5$ to 500,
$z = 5$ to 500,
$R^1$, $R^2$, $R^3$, $R^4$, $R^5$ and $R^6$ denote, independently of one another, a saturated and/or unsaturated, unbranched or branched alkyl group haviang 1 to 4 carbon atoms and/or an aryl group having 6 to 9 carbon atoms, said aryl group being unsubstituted or alkyl substituted,
$R^7$ is a straight chained or branched alkyl group having 6 to 18 carbon atoms and $R^7$ and H each amount to at least 3% of the number of groups attached to Si.

15 Claims, No Drawings

HYDROPHOBIC PIGMENTS AND FILLERS FOR INCORPORATION IN SYNTHETIC RESINS

BACKGROUND OF THE INVENTION

1. Field of the Invention

This invention relates to hydrophobic pigments and fillers, their preparation and their use for incorporation in synthetic resins.

2. Background Information

Complete dispersion of pulverulent pigments and fillers in synthetic resins is difficult, especially in foils and sheets, hollow bodies and monofils. Agglomerates of undispersed particles are recognizable as hard lumps or specks and may, in some cases, impair the mechanical properties of the products in which they occur. Incomplete dispersion of pigments causes uneven coloring and the optimum effect of the pigments is usually not fully utilized. It is therefore customary to modify the surface of finely divided solid particles of pigments and fillers by means of substances which render them hydrophobic with a view to improving their dispersibility in synthetic resins.

Polydimethylsiloxanes, for example, may be used for hydrophobicizing various types of surface (see Noll, Chemie und Technologie der Silicone; 2nd Edition 1968, page 386 et seq.)

According to JP-A No. 7 956 083 and JP-A No. 8 143 264, hydrophobic pigments with improved dispersibility are obtained by grinding the finely divided solid particles together with polymethyl hydrogen siloxane.

The pigments obtained by this procedure, however, tend to form a great deal of dust, e.g., in the course of preparation, handling and processing of the pigments.

The formation of dust may be reduced according to DE-A 2 001 469 by using an ester in addition to a siloxane. The esters, however, impair not only the dispersibility, but also the flow properties and ease of dosing the pigments.

Pigments which are free-flowing, easily dosed and with little tendency to form dust may be obtained by subjecting the pigments to a process of granulation. Thus, for example, a slurry of dry, micronized pigments may be prepared by mixing them with a liquid which can be evaporated, and the slurry may then be dried in a spray drier (GB-A No. 809 284).

The granulated pigments obtained by this method, however, are insufficiently dispersible in synthetic resins, with the result that the mechanical properties of the synthetic resins (e.g., their notched bar impact strength) are seriously impaired.

SUMMARY OF THE INVENTION

It is an object of the present invention to provide hydrophobic pigments and fillers which do not have the disadvantages of the known pigments and fillers.

Pigments and fillers which eminently satisfy these requirements have now surprisingly been found.

These hydrophobic pigments and fillers containing from 0.05 to 10% by weight, based on the quantity of the pigment or filler, of an organopolysiloxane corresponding the general formula

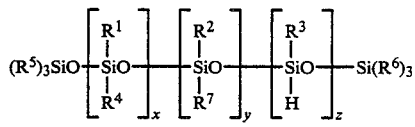

wherein
$x = 0$ to 500,
$y = 5$ to 500,
$z = 5$ to 500,
$R^1$, $R^2$, $R^3$, $R^4$, $R^5$ and $R_6$ denote, independently of one another, a saturated and/or unsaturated, optionally branched alkyl group with 1 to 4 carbon atoms and/or an aryl group with 6 to 9 carbon atoms which may also be alkyl substituted, and
$R^7$ denotes an alkyl group with 6 to 18 carbon atoms, and of the number of groups attached to Si, at least 3% are $R^7$ and at least 3% are H.

DETAILED DESCRIPTION OF THE INVENTION

Pigments and fillers containing the above organopolysiloxanes corresponding to the general formula have particularly advantageous properties if the groups $R^1$, $R^2$, $R^3$, $R^4$, $R^5$ and $R^6$ in the general formula are methyl groups.

The pigments and fillers according to the invention are preferred if in the general formula for the organopolysiloxanes,
$x = 0$ to 100,
$y = 5$ to 100,
$z = 5$ to 100, and $x + y + z = 25$ to 300
and at least 3% of the number of groups attached to Si are $R^7$ and at least 10% are H.

Pigments and fillers according to the invention are also preferred if in the general formula for the organopolysiloxanes,
$x = 0$,
$y = 5$ to 50,
$z = 5$ to 60
and $y + z$ is greater than 25 and at least 10% of the number of groups attached to Si are $R^7$ and at least 30% are H.

The end group substituents $R^5$ and $R^6$ need not be identical, which means that the substituents attached to one and the same terminal silicon atom may differ from one another.

The groups $R^7$ may be straight chained and/or branched alkyl groups.

Examples of straight chained groups $R^7$ include the hexyl, octyl, nonyl, decyl, dodecyl and tetradecyl groups; examples of branched alkyl groups include the 3-methyl-pentyl, 2,3-dimethylbutyl, 3-butylhexyl and 4-propyloctyl groups. the organopolysiloxanes may contain identical or different groups $R^7$. The alkyl groups $R^7$ preferably consist of dodecyl and tetradecyl groups, especially mixtures of these two.

The present invention also relates to hydrophobic pigments and fillers containing from 0.05 to 10% by weight, based on the quantity of pigment or filler, of a combination of organopolysiloxanes according to the invention and polyorgano hydrogen siloxanes corresponding to the general formula

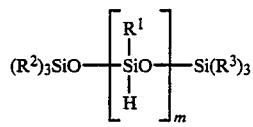

wherein m=5 to 200; $R^1$, $R^2$ and $R^3$ are independent of one another and have the meanings indicated above; and organopolysiloxanes and polyorgano hydrogen siloxanes are present in proportions in the range of from 4:1 to 1:4.

The pigments according to the invention may be ground and/or micronized and/or granulated inorganic or organic pigments.

The inorganic pigments according to the invention may consist, for example, of titanium dioxide pigments which may be present in the rutile or the anatase form and are prepared by the sulphate or chloride process and may be lattice stabilized. Other examples of suitable inorganic pigments according to the invention include zinc oxide, lithopone, iron oxide pigments, cadmium pigments such as cadmium sulphide or cadmium sulphoselenide, ultramarine pigments, chormate pigments, chromium oxide pigments and oxidic mixed phase pigments such as spinel and rutile mixed phase pigments including both colored and magnetic pigments. Examples of fillers according to the invention include natural and precipitated calcium carbonates, aluminium hydroxides, silicas obtained by various processes, talc, mica and kaolin. The inorganic colored and magnetic pigments and fillers may have been previously subjected to an inorganic after-treatment.

The following are examples of suitable organic pigments: Azo pigments, for example from the arylamide-, pyrazolone-, β-naphthol- or β-hydroxynaphthoic acid series, metal complex pigments, anthraquinone pigments, polycyclic pigments, for example, from the perylene-, perinone-, quinancridone-, isoindoline-, dioxazine-, indanthrene-, thioindigo-, anthanthrone-, or pyrrolopyrrole series, and phthalocyanine pigments such as Phthalocyanine Blue and Phthalocyanine Green.

The pigments and fillers according to the invention preferably contain from 0.1 to 5% by weight of organopolysiloxane or of a combination of organopolysiloxane and polyorgano hydrogen siloxane, based on the quantity of pigment and/or filler. Products containing from 0.15 to 2% by weight or organopolysiloxane or a combination or organopolysiloxane and polyorgano hydrogen siloxane are particularly preferred, especially in the case of pigments.

If the pigments are granulated, they preferably contain from 0.3 to 1.5% by weight of organopolysiloxane or a combination of organopolysiloxane and polyorgano hydrogen siloxane.

The pigments and fillers according to the invention are prepared by spraying and/or mixing the pigments and fillers with the organopolysiloxane or combination of organopolysiloxane and polyorgano hydrogen siloxane applied as a mixture or separately in any sequence, preferably before and/or during a final grinding of the pigments or fillers.

In this process of preparing the pigments and fillers, it is immaterial whether the organopolysiloxane or combination of organopolysiloxane and polyorgano hydrogen siloxane is added to the moist filter cake, paste or slurry of freshly prepared pigment or filler before the latter is dried or whether it is added by some suitable method to the dry goods immediately before the final grinding process, for example, by spraying, or whether, in the case of steam jet grinding, the siloxane compounds are added to the steam immediately before it is introduced into the jet mill. The organopolysiloxane or combination of organopolysiloxane and polyorgano hydrogen siloxane may be converted into an emulsion before being added to the pigment or filler.

In a process for the preparation of granulated pigment, the organopolysiloxane or combination of organopolysiloxane and polyorgano hydrogen siloxane is added as a mixture or separately, in any desired sequence, to the pigment before and/or during spray drying of the pigment. It is preferable to add the organopolysiloxane or combination of organopolysiloxane and polyorgano hydrogen siloxane to a pigment slurry before spray drying is carried out. In that case, the organopolysiloxane or combinatin of organopolysiloxane and polyorgano hydrogen siloxane may first be converted into an emulsion or it may be directly stirred into the pigment slurry.

The pigment slurry may consist entirely of pigment and a vaporizable liquid, e.g. water, in the proportions required to produce a slurry which can be pumped and atomized. If higher pigment contents are required, the lowering of viscosity which is then necessary may be achieved by the addition of liquefying substances such as polyphosphates, formic acid and polyacrylates with various molecular weight distributions.

The spray drying is carried out in a known manner, either with single-phase nozzles, i.e., by atomizing by pressurization of the slurry, or with two-phase nozzles, i.e., by atomizing with the aid of compressed gas, or with rotating disc atomizers.

When pigments and fillers are treated with the combination of organopolysiloxane and polyorgano hydrogen siloxane, the desired modification can easily be to a large extent optimized for different types of pigments and fillers by suitable choice of the proportions of the two components so that there is no need to keep in stock a large number of different organopolysiloxanes of the given general formula.

The pigments and fillers according to the invention are strongly hydrophobic and are particularly suitable for incorporation in synthetic resins by virtue of the ease with which they can be completely dispersed. They may also be incorporated in varnishes, building materials, magnetic tapes and other magnetic information carriers as well as in magnetic or non-magnetic toning agents.

The amount of dust generated in the course of preparation and working up of the pigments and fillers according to the invention is very slight. Furthermore, the pigments and fillers according to the invention are found to be very stable in storage, i.e., their hydrophobic character and dispersibility are not significantly impaired even after prolonged storage. Also the disadvantageous influence of storage on the colorimetric values of colored pigments is strongly diminished. The fluidity and ease with which the ground or micronized pigments and fillers can be accurately dosed may be improved without any loss of the advantages indicated above by using an organopolysiloxane which contains a very high proportion of Si-H groups within the range indicated above.

The granulated pigments according to this invention are free-flowing, have excellent characteristics for dosing and produce virtually no dust. Their dispersibility in a wide variety of synthetic resins is greatly improved with much less impairment of the mechanical properties of the synthetic resins containing these pigments. The good dispersibility also improves the optical properties, such as brightening. The product can easily be packaged, stored, transported, dosed and used for further processing.

The pigments and fillers according to the invention are tested according to the instructions given below. The degree to which the pigments and fillers have been rendered hydrophobic is determined by scattering 0.5 g of pigment or filler over the surface of about 200 ml of deionized water in a 400 ml glass beaker. The degree to which the products have been rendered hydrophobic is assessed visually after they have been stirred with a glass rod.

Formation of dust:

The formation of dust is tested in a dust measuring apparatus in which 40 g of pigment or filler are dropped all at once through a vertical glass tube 45 mm in diameter into a 2 l glass vessel 120 mm in diameter from a height of 1300 mm. The dust generated by this procedure is carried by an air current of 1 m³/h through a glass tube 30 mm in diameter in which it flows at about 40 cm/s past a photoelectric cell. The reduction in transmission caused by the presence of dust is determined and converted into extinction values in a known manner. The extinction values are a direct measure of the intensity of dust development. Extinction values below 0.05 are characteristic of very slight dust development, values from 0.05 to 0.1 indicate slight dust development, values from 0.1 to 0.2 correspond to mode-rate dust development and values from 0.2 to 0.4 indicate strong dust development and values above 0.4 indicate very strong dust development.

Dispersibility in synthetic resins:

The dispersibility in synthetic resins was tested in polyvinyl chloride (PVC) by strewing the product into the PVC and it was tested in polyethylene (PE) by a so-called blown film test.

When the strewing-in test is used for testing white pigments, 50 g of PVC compound (basic mixture A according to DIN 53 775) and 0.5 g of flame soot are intimately mixed in a polyethylene beaker by means of a spatula and plasticized on a two roller mill at 165° C. with a friction of 1:1.2 for 2 minutes to form a black sheet. 5 g of pigment are weighed out and then strewn on the rolled sheet within 0.5 minutes. Any pigment adhering to the rollers is scraped off with a copper spatula and also worked into the sheet. The time is then registered and samples measuring about 10×10 cm are removed after dispersing for 1, 2, 4, 8, and 16 minutes on the two roller mill while the PVC sheet is continuously turned by hand.

The procedure used for testing colored pigments is similar, only the basic mixture A is replaced by white basic mixture B according to DIN 53 775 and 0.5 g of colored pigment are used.

The quality of the produt in terms of the specks found is assessed as follows:

| Stage | 1 | very good | no specks |
|---|---|---|---|
| | 2 | good | specks up to 2 minutes |
| | 3 | moderate | specks up to 4 minutes |
| | 4 | poor | specks up to 8 minutes |
| | 5 | very poor | specks up to 16 minutes. |

In the blown film test, a so-called master batch is first produced from 150 g of high pressure PE (melt index about 20) and 350 g of pigment. To prepare this master batch, the pigment and synthetic resin powder are mixed by shaking them in a plastic bag and are then passed through a 2 mm screen and batched in a twin-screw kneader at 295° C. and 60 revs/min. 500 g of high pressure PE (melt index about 0.5) are then mixed with 7.1 g of master batch and the mixture is extruded at 220° C. and blown to form films. 0.4 m² of each film is examined for pigment specks.

Granulated pigments according to the invention were examined by determining the following properties: Average diameter of the granulates:

The arithmetically average diameter of the mass distribution $D_{av}$ according to DIN 53 206 was determined from screen analyses using screens with a width of mesh from 0.035 to 1.0 mm.

$$D_{av} = \frac{\Sigma V_i \cdot D_i}{\Sigma V_i}$$

$V_i$ = relative proportion of particle masses of the ith screen fraction $D_i$ = middle diameter of the ith screen fraction. Fluidity:

A glass funnel having a diameter of about 70 mm at the top and an outflow diameter of 3 mm is filled with pigment and the outflow of pigment is assessed on the following scale:

very good fluidity: pigment flows freely out of the funnel good fluidity: pigment flows out of the funnel after the funnel has been knocked once.

moderate fluidity: pigment flows out after the funnel has been knocked several times poor fluidity: pigment fails to flow out in spite of frequent knocking.

Dispersibility in PE:

The blown film test described above is used for testing the dispersibility in PE. 0.4 m² of the films obtained are examined for pigment specks.

The dispersibility is assessed according to the number of specks:

very good: fewer than 10 specks good: up to 20 specks moderate: up to 50 specks poor: more than 50 specks.

Notched bar impact strength in acrylonitrile/-butadiene/styrene terpolymer (ABS):

90 Parts of Novodur PH-AT ® (Trade product of Bayer AG) and 10 parts of pigment are mixed together and extruded through a two-shaft extruder at 190° C. The strands drawn off are granulated, dried and moulded in an injection moulding machine at 220° C. to form standard test rods. The notched bar impact strength of each of 10 test rods is determined according to DIN 53 453.

Unpigmented samples are used as controls.

The notched bar impact strength of unpigmented samples Novodur PH-AT ® was found to be 10.5 kJ/m².

The notched bar impact strength of pigmented Novodur PH-AT ® was assessed as follows:
very good: at 9.0 kJ/m² and over
good: at 8.5 to 8.9 kJ/m²
moderate: at 8.0 to 8.4 kJ/m²
poor: below 8.0 kJ/m².

The process of preparing the pigments and fillers according to the invention is illustrated in the following Examples. All parts and percentages given in the Examples refer to weight. The specific surface areas were determined by the one point method of BET (N₂ method DIN 66 131).

Examples 1 to 13, 16 and 17 and Comparison Examples A to E and G to I relate to pulverulent pigments and fillers and Examples 14 and 15 and Comparison Example F relate to pigment granulates.

The results are summarized in Tables 1 to 4 for comparison.

EXAMPLE 1

A TiO₂ pigment with rutile structure prepared by the sulphate process was after treated inorganically with 1% ZrO₂, 1.3% SiO₂ and 2.5% Al₂O₃ and dried after the usual wshing and filtration. The pigment has a specific surface area of 15 m²/g. The pigment is sprayed with 0.75% of an organopolysiloxane corresponding to the formula

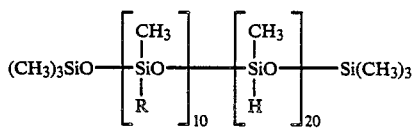

R=mixture of C₁₂H₂₅ and C₁₄H₂₉ about 2:1 and micronized in a jet mill operated with superheated steam.

COMPARISON EXAMPLE A

The rutile pigment used in Example 1 is sprayed with 0.75% of a polyorgano hydrogen siloxane corresponding to formula

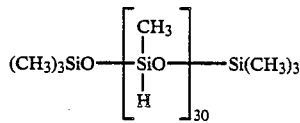

after it has been dried and is then micronized as in Example 1.

EXAMPLE 2

A TiO₂ pigment with rutile structure prepared by the sulphate process was inorganically after-treated with 1% Al₂O₃ and dried after the usual washing and filtration. The pigment has a specific surface area of 11 m²/g. The pigment is sprayed with 0.17% of the organopolysiloxane from Example 1 and 0.33% of the polyorgano hydrogen siloxane from Comparison Example A and micronized as in Example 1.

COMPARISON EXAMPLE B

After the pigment used in Example 2 has been dried, it is sprayed with 0.5% of the polyorgano hydrogen siloxane from Comparison Example A and 0.5% of dioctylphthalate and then micronized as in Example 1.

EXAMPLE 3

0.5% of an organopolysiloxane corresponding to the formula

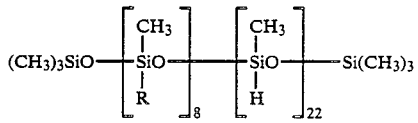

in which R has the same meaning as in Example 1 is kneaded into the wet filter cake of the rutile pigment used in Example 2. After drying, the pigment is micronized as in Example 1.

EXAMPLE 4

After the rutile pigment used in Example 2 has been dried it is sprayed with 0.5% of an organopolysiloxane corresponding to the formula

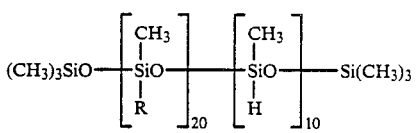

in which R has the same meaning as in Example 1 and is then micronized as in Example 1.

EXAMPLE 5

After the rutile pigment used in Example 2 has been dried, it is sprayed with 0.5% of an organopolysiloxane corresponding to the formula

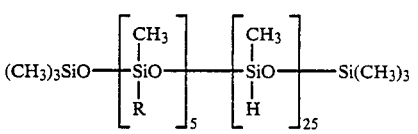

in which R=C₁₈H₃₇ and the pigment is micronized as in Example 1.

EXAMPLE 6

After the rutile pigment used in Example 2 has been dried, it is sprayed with 0.5% of an organopolysiloxane corresponding to the formula

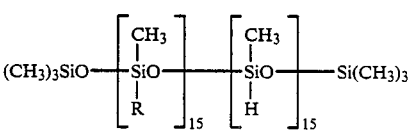

R=C₆H₁₃ and micronized as in Example 1.

EXAMPLE 7

The rutile pigment used in Example 2 is dried and then sprayed with 0.5% of an organopolysiloxane corresponding to the formula

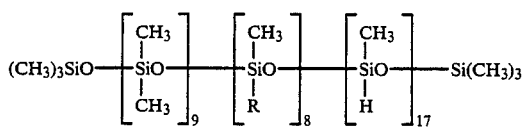

in which R has the same meaning as in Example 1 and then micronized as in Example 1.

EXAMPLE 8

A TiO$_2$ pigment with rutile structure which has been prepared by the sulphate process and has not been inorganically after-treated and has a specific surface area of 9 m$^2$/g is sprayed with 1.0% of the organopolysiloxane from Example 3 and micronized as in Example 1.

COMPARISON EXAMPLE C

The rutile pigment used in Example 8 is sprayed with 1.0% of the polymethylhydrogen siloxane from Comparison Example A and micronized as in Example 1.

EXAMPLE 9

An iron oxide red pigment having a specific surface area of 9.5 m$^2$/g is sprayed with 0.6% of the organopolysiloxane from Example 3 and micronized as in Example 1.

COMPARISON EXAMPLE D

The iron oxide red pigment used in Example 9 is sprayed with 0.6% of the polymethyl hydrogen siloxane from Comparison Example A and micronized as in Example 1.

EXAMPLE 10

A chromium oxide green pigment having a specific surface area of 4.0 m$^2$/g is sprayed with 0.4% of the organopolysiloxane from Example 3 and micronized as in Example 1.

EXAMPLE 11

A chrome antimony titanium yellow pigment having a specific surface area of 6.2 m$^2$/g is sprayed with 0.4% of the organopolysiloxane from Example 3 and micronized as in Example 1.

EXAMPLE 12

A precipitated calcium carbonate filler having a specific surface area of 6.8 m$^2$/g is sprayed with 0.4% of the organopolysiloxane from Example 3 and micronized as in Example 1.

COMPARISON EXAMPLE E

The calcium carbonate used in Example 12 is sprayed with 0.4% of the polymethyl hydrogen siloxane from Comparison Example A and micronized as in Example 1.

EXAMPLE 13

A precipitated silica having a specific surface area of 190 m$^2$/g is sprayed with 3.0% of the organopolysiloxane from Example 3 and micronized as in Example 1.

Dust measurement is not possible in this case as the product is obtained in an extremely voluminous form. According to visual assessment, the amount of dust produced is much less than that formed when this silica is modified with the polymethyl hydrogen siloxane from Comparison Example A.

EXAMPLE 14

A TiO$_2$ pigment with rutile structure prepared by the sulphate process was inorganically after-treated with 1% Al$_2$O$_3$. The pigment was then filtered and washed with deionized water. The filter cake was diluted with deionized water to form a slurry having a solids content of 50%. 1% (based on the quantity of pigment) of an organopolysiloxane corresponding to the formula

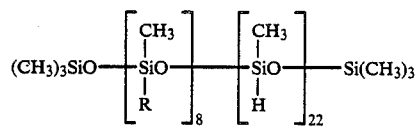

in which R denotes an approximately 2:1 mixture of C$_{12}$H$_{25}$ and C$_{14}$H$_{29}$ was stirred into this slurry. The suspension was dried in a spray drier.

COMPARISON EXAMPLE F

The TiO$_2$ pigment used in Example 14 was sand ground after it had been after-treated with 1% Al$_2$O$_3$. It was then filtered and washed as in Example 14 and the slurry was adjusted to a solids content of 50%.

Spray drying was carried out without the addition of an organopolysiloxane.

EXAMPLE 15

The filter cake of the TiO$_2$ pigment used in Example 14 was liquefied by the addition of 0.1% formic acid (based on the quantity of pigment). The solids content of the suspension was 61%. 0.7% of the organopolysiloxane from Example 1 and in addition 0.3% of a polyorgano hydrogen siloxane corresponding to the formula

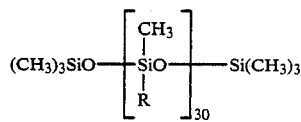

(both based on the quantity of pigment) were then stirred into the slurry and the slurry was dried in a spray drier.

EXAMPLE 16

0.5% by weight of the organopolysiloxane of Example 3 is introduced into a mixing unit filled with Bayferrox 110 iron oxide red (commercial product of Bayer AG). After a homogeneous mixture has been prepared the iron oxide is ground in a pendulum roller mill.

COMPARATIVE EXAMPLE G 0.5% by weight of the polymethylhydrogensiloxane of comparative example A is introduced into a mixing unit filled with Bayferrox 110 iron oxide red (commercial prduct of Bayer AG). After a homogeneous mixture has been prepared the iron oxide is ground in a pendulum roller mill.

COMPARATIVE EXAMPLE H 0.15% by weight of polypropylene glycol is introduced into a mixing unit filled with Bayferrox 110 iron oxide red (commercial product of Bayer AG). After a homogeneous mixture has been prepared the iron oxide is ground in a pendulum roller mill.

EXAMPLE 17

0.5% by weight of the organopolysiloxane of Example 3 is introduced into a mixing unit filled with Bayferrox 8600 iron oxide black (commercial product of Bayer AG). After a homogeneous mixture has been prepared the iron oxide is ground in a pendulum roller mill.

COMPARATIVE EXAMPLE I 0.15% by weight of polypropylene glycol is introduced into a mixing unit filled with Bayferrox 8600 iron oxide black (commercial product of Bayer AG). After a homogeneous mixture has been prepared the iron oxide is ground in a pendulum roller mill.

By means of the hydrophobing treatment of Example 17 a considerable improvement in dispersibility is achieved in the preparation of magnetic toning agents while the magnetic properties remain unchanged and only a low amount of dust is formed.

TABLE 3

Quality data of iron oxide red pigments

| Example | Colour differences over comparative example H[a] 10% PVK[b] Alkydal F 48 CIELAB C/2 grd | | | Dust formation during grinding |
|---|---|---|---|---|
| | Colour saturation $\Delta C^*$ | Red shade $\Delta a^*$ | Yellow shade $\Delta b^*$ | |
| G | 1.8 | 1.0 | 1.5 | high |
| 16 | 1.5 | 0.9 | 1.4 | low |

[a]Determination of the colour difference of the pigments of Examples G and 16 compared with comparative example H in the Alkydal F 48 lacquer, a commercial product of Bayer AG, according to DIN 6174 (equivalent to ISO/DIN7724, 1–3 drafts).
[b]pigment volume concentration (a) Determination of the colour difference of the pigments of Examples G and 16 compared with comparative example H in the Alkydal F 48 lacquer, a commercial product of Bayer AG, according to DIN 6174 (equivalent to ISO/DIN7724, 1–3 drafts).

(b) pigment volume concentration

TABLE I

| Example | Degree to which product is rendered hydrophobic | Formation of dust (measured by extinction) | | Dispersibility in PE | Dispersibility in PVC | Type of pigment |
|---|---|---|---|---|---|---|
| 1 | completely | slight | (0.07) | very good | very good | TiO$_2$ pigment after-treated with 1% ZrO$_2$, 1.3% SiO$_2$, 2.5% Al$_2$O$_3$ |
| A | largely | very strong | (1.01) | very good | good | |
| 2 | completely | very slight | (0.04) | very good | very good | |
| B | largely | moderate | (0.15) | moderate | moderate | |
| 3 | completely | very slight | (0.02) | very good | very good | TiO$_2$ pigment after-treated with 1% Al$_2$O$_3$ |
| 4 | completely | very slight | (0.02) | very good | very good | |
| 5 | completely | very slight | (0.04) | very good | very good | |
| 6 | completely | slight | (0.05) | very good | very good | |
| 7 | completely | very slight | (0.04) | very good | very good | |
| 8 | completely | very slight | (0.03) | very good | good | TiO$_2$ pigment not after treated inorganically |
| C | completely | strong | (0.31) | very good | good | |
| 9 | completely | very slight | (0.03) | very good | good | iron oxide pigment |
| D | completely | very strong | (0.65) | very good | good | |
| 10 | completely | very slight | (0.02) | very good | good | chrome oxide green pigment |
| 11 | completely | very slight | (0.01) | very good | good | chrome antimony titanium pigment |
| 12 | completely | slight | (0.05) | very good | very good | calcium carbonate filler |
| E | completely | very strong | (0.41) | very good | very good | |
| 13 | completely | not measurable | | very good | very good | precipitated silica |

TABLE 2

| Example | Average diameter of granulate | Fluidity | Dispersibility in PE | Notched bar impact strength in ABS |
|---|---|---|---|---|
| 14 | 94 μm | very good | very good (2 specks/0.4 m$^2$) | very good (9.1 KJ/m$^2$) |
| F | 88 μm | very good | poor (100 specks/0.4 m$^2$) | poor (5.2 KJ/m$^2$) |
| 15 | 107 μm | very good | very good (0 specks/0.4 m$^2$) | very good (9.0 KJ/m$^2$) |

TABLE 4

| | Quality data of magnetic pigments | | | |
|---|---|---|---|---|
| Example | Hydrophobicity | Oil absorption | Coercive force at 3.5 kOe | Dust formation |
| 17 | yes | 21 | 88 | low |
| I | no | 32 | 89 | low |

It will be appreciated that the instant specification and claims are set forth by way of illustration and not limitation, and that various modifications and changes may be made without departing from the spirit and scope of the present invention.

What is claimed is:

1. A modified hydrophobic colored or magnetic pigment or filler comprising a hydrophobic pigment or filler containing 0.05 to 10% by weight, based on the weight of the pigment or filler, of an organopolysiloxane corresponding to the formula

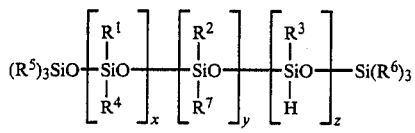

wherein
x=0 to 500,
y=5 to 500,
z=5 to 500,
$R^1$, $R^2$, $R^3$, $R^4$, $R^5$ and $R^6$ denote, independently of one another, a saturated and/or unsaturated, unbranched or branched alkyl group having 1 to 4 carbon atoms or an aryl group having 6 to 9 carbon atoms, said aryl group being unsubstituted or alkyl substituted,
$R^7$ is a straight chained or branched alkyl group having 6 to 18 carbon atoms and
$R^7$ and H each amount to at least 3% of the number of groups attached to Si.

2. A hydrophobic colored or magnetic pigment or filler according to claim 1, wherein the groups $R^1$, $R^2$, $R^3$, $R^4$, $R^5$ and $R^6$ are methyl groups.

3. A hydrophobic colored or magnetic pigment or filler according to claim 1, wherein
x=0 to 100,
y=5 to 100,
z=5 to 100,
x+y+z=25 to 300
and of the number of groups attached to Si, at least 3% are $R^7$ and at least 10% are H.

4. A hydrophobic colored or magnetic pigment or filler according to claim 1, wherein
x=0,
Y=5 to 50,
z=5 to 60,
y+z is greater than 25 and of the number of groups attached to Si at least 10% are $R^7$ and at least 30% are H.

5. A hydrophobic colored or magnetic pigment or filler according to claim 1, wherein $R^7$ is an alkyl group selected from the group consisting of hexyl, octyl, nonyl, decyl, dodecyl, tetradecyl, 3-methyl-pentyl, 2,3,-dimethylbutyl, 3-butylhexyl and 4-propyl-octyl.

6. A hydrophobic colored or magnetic pigment or filler according to claim 1, wherein $R^7$ is selected from the group consisting of a dodecyl group, a tetradecyl group and mixtures thereof.

7. A hydrophobic colored or magnetic pigment or filler according to claim 1, wherein the proportion of the organopolysiloxane amounts to 0.1 to 5% by weight, based on the quantity of the pigment or filler.

8. A hydrophobic colored or magnetic pigment according to claim 1, wherein the pigment is granulated and the proportion of the organopolysiloxane amounts to 0.3 to 5% by weight, based on the quantity of the pigment or filler.

9. A hydrophobic pigment according to claim 1, wherein the pigment is selected from the group consisting of titanium dioxide pigments, zinc oxide, lithopone, iron oxide pigments, cadmium pigments, ultramarine pigments, chromate pigments, chromium oxide pigments, oxidic mixed phase pigments, azo pigments, metal complex pigments, anthraquinone pigments, polycyclic pigments and phthalocyanine pigments.

10. A hydrophobic filler according to claim 1, wherein the filler is selected from the group consisting of calcium carbonates, aluminum hydroxides, silicas, talc, mica and kaolin.

11. A modified hydrophobic pigment or filler comprising a hydrophobic pigment or filler and 0.05 to 10% by weight, based on the weight of the pigment or filler, of a combination or an organopolysiloxane according to claim 1 and a polyorgano hydrogen siloxane corresponding to the formula

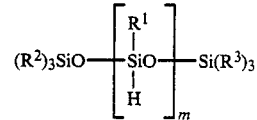

wherein m=5 to 200 and the groups $R^1$, $R^2$ and $R^3$, which are independent of one another and have the meanings indicated in claim 1, and organopolysiloxane and the polyorgano hydrogen siloxane are present in proportions within the range of from 4:1 to 1:4.

12. A hydrophobic pigment or filler according to claim 11, wherein the proportion of the combination of the organopolysiloxane and the polyorgano hydrogen siloxane amounts to 0.1 to 5% by weight, based on the quantity of the pigment or the filler.

13. A hydrophobic pigment according to claim 11, wherein the pigment is granulated and the proportion of the combination of the organopolysiloxane and the polyorgano hydrogen siloxane amounts to from 0.3 to 5% by weight, based on the quantity of the pigment.

14. A hydrophobic pigment according to claim 11, wherein the pigment is selected from the group consisting of titanium dioxide pigments, zinc oxide, lithopone, iron oxide pigments, cadmium pigments, ultramarine pigments, chromate pigments, chromium oxide pigments, oxidic mixed phase pigments, azo pigments, metal complex pigments, anthraquinone pigments, polycyclic pigments and phthalocyanine pigments.

15. A hydrophobic filler according to claim 11, wherein the filler is selected from the group consisting of calcium carbonates, aluminium hydroxides, silicas, talc, mica and kaolin.

* * * * *

UNITED STATES PATENT AND TRADEMARK OFFICE
CERTIFICATE OF CORRECTION

PATENT NO. : 4,810,305

DATED : March 7, 1989

INVENTOR(S) : Rolf M. Braun, et al

It is certified that error appears in the above-identified patent and that said Letters Patent is hereby corrected as shown below:

| | |
|---|---|
| Col. 4, line 18 | Correct spelling of --combination-- |
| Col. 5, line 35 | Delete "mode-rate" and substitute --moderate-- |
| Col. 7, line 23 | Delete "after treated" and substitute --after-treated-- |
| Col. 7, line 25 | Delete "wshing" and substitute --washing-- |
| Col. 10, lines 40-45 | Middle, bottom of formula delete \| and substitute \| "R"              --H-- |
| Col. 12, lines 12-15 | Delete "aDetermination... concentration" |

Signed and Sealed this

Fourth Day of September, 1990

Attest:

HARRY F. MANBECK, JR.

*Attesting Officer*     *Commissioner of Patents and Trademarks*